US005484134A

United States Patent [19]

Francis

[11] Patent Number: 5,484,134

[45] Date of Patent: Jan. 16, 1996

[54] VEHICLE WHEEL LIFT AND STAND APPARATUS

[75] Inventor: Richard T. Francis, Easton, Mo.

[73] Assignee: Gray Automotive Products Company, St. Joseph, Mo.

[21] Appl. No.: 212,953

[22] Filed: Mar. 15, 1994

[51] Int. Cl.[6] .......... B60P 1/00

[52] U.S. Cl. .......... 254/2 B; 254/89 H

[58] Field of Search .......... 254/2 R, 2 B, 254/8 R, 8 B, 93 H, 133, 134, 89 H, 89 R; 269/69; 248/354.5; 187/8.47, 8.49, 8.5; 424/389, 399

[56] References Cited

U.S. PATENT DOCUMENTS

| | | | |
|---|---|---|---|
| 2,763,465 | 9/1956 | Tosi et al. | 254/2 B |
| 3,647,183 | 3/1972 | Rishovd | 254/2 B |
| 4,597,561 | 7/1986 | Wenzel . | |
| 4,599,034 | 7/1986 | Kennedy et al. . | |

*Primary Examiner*—Robert C. Watson

*Attorney, Agent, or Firm*—Hovey, Williams, Timmons & Colilns

[57] ABSTRACT

An apparatus for lifting and supporting a vehicle relative to the ground includes a base assembly and a relatively shiftable carriage assembly. The base assembly includes a base resting on the ground and an upstanding post, and the cradle assembly is supported on the post for up and down movement. A piston and cylinder assembly is connected between the base assembly and the cradle assembly for moving the cradle up and down, and a pawl and ratchet assembly permits unrestricted upward movement of the cradle assembly while preventing unrestricted downward movement. A locking assembly is provided for locking the cradle assembly in a raised position relative to the base assembly. The locking assembly includes a hole in the post, a hole in the cradle assembly that is aligned with the hole in the post in the raised position of the cradle assembly, and a pin insertable through the hole in the cradle assembly into the hole in the post to prevent the cradle assembly from being moved either up or down relative to the base assembly.

14 Claims, 2 Drawing Sheets

Fig.2.
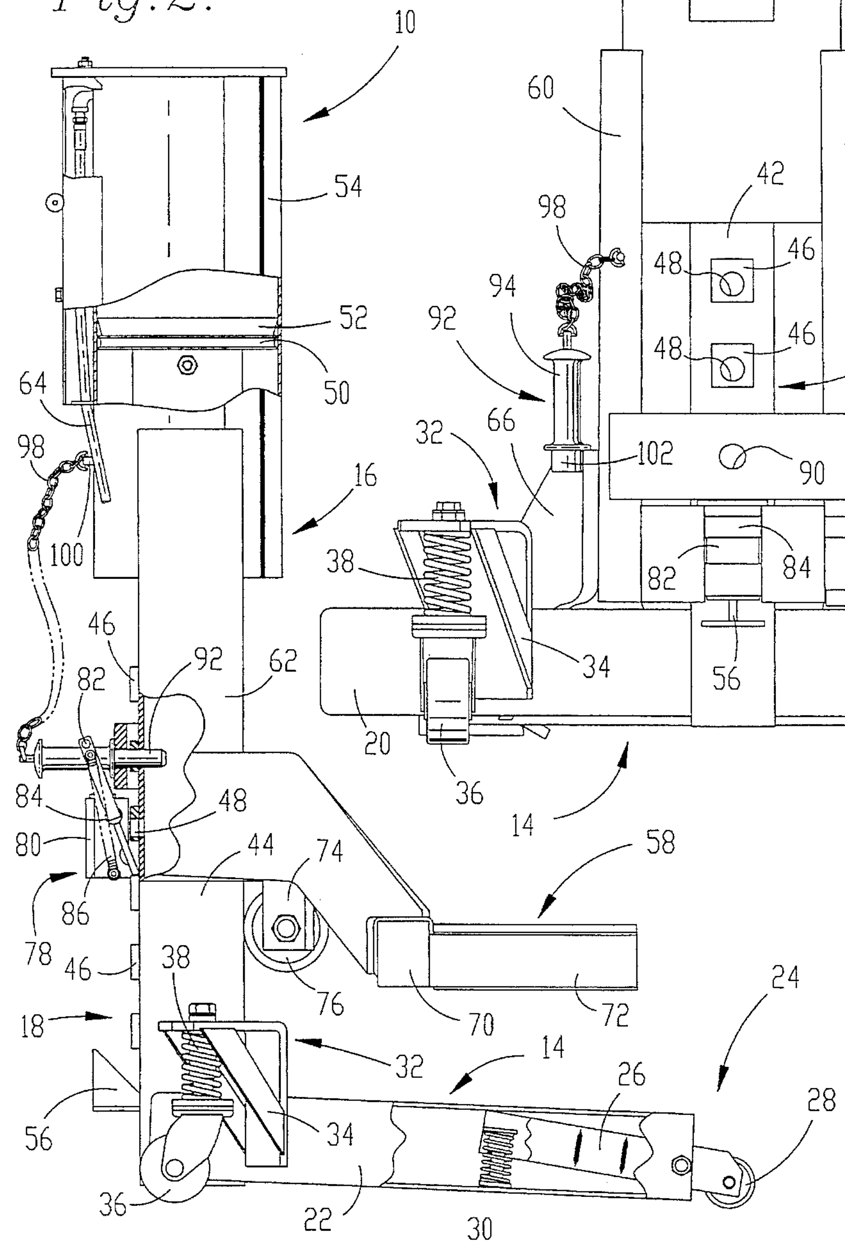
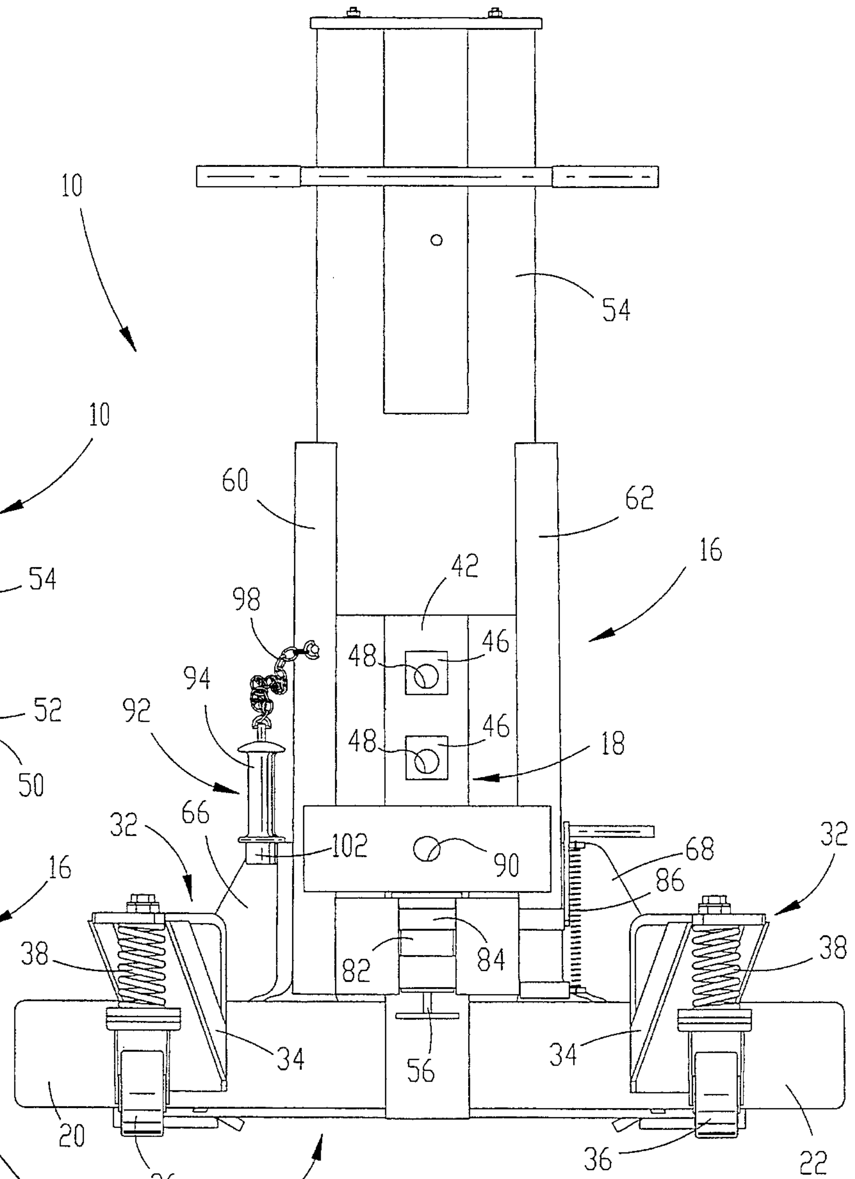
Fig.3.

VEHICLE WHEEL LIFT AND STAND APPARATUS

BACKGROUND OF THE INVENTION

1. Field of the Invention

The present invention relates generally to vehicle lifts and stands, and more particularly to an apparatus for lifting a vehicle relative to the ground and then supporting the vehicle at the lifted position.

2. Discussion of the Prior Art

The maintenance of vehicles such as cars and trucks frequently requires access to the underside of the vehicles in order to permit repair of such parts as transmissions, clutches, gearing, joints, brakes, and the like. In order to reach these areas of a vehicle, a worker will typically employ one or more lifting devices that are positioned beneath the vehicle chassis or wheels and actuated to lift the vehicle above the ground.

Once the vehicle has been raised to a desired height for carrying out the desired maintenance, stands are positioned beneath the vehicle to support it during the repairs, and the lifting devices are removed. The stands are used in place of the lifting devices because of the added support typically provided by such stands, and because such stands do not allow inadvertent upward or downward shifting of the vehicle.

A conventional pneumatic lift is typically not used as a stand since it is possible for the position of a vehicle to shift while a worker is beneath the vehicle. For example, if the vehicle is supported on a pair of lifts and a large load such as the transmission of the vehicle is removed, the sudden reduction in the weight of the vehicle may result in further lifting of the vehicle by the lifts. Such movement of the vehicle is not allowed by a support stand.

Objects and Summary of the Invention

It is an object of the present invention to provide a vehicle wheel lift and stand apparatus that functions as a lifting device as well as a support stand, enabling a vehicle to be lifted to and maintained at any of a number of different raised positions.

It is another object of the present invention to provide a vehicle wheel lift apparatus adapted for use with modern trucks having aerodynamic skirts which impede direct engagement with the chassis, wherein the apparatus also provides stable support for the truck once lifted.

In accordance with these and other objects evident from the following description of a preferred embodiment of the invention, a vehicle wheel lift and stand apparatus includes a base assembly and a cradle assembly. The base assembly includes a base adapted to rest on the ground, and an upstanding post extending generally vertically upward from the base. The cradle assembly is supported on the post for up and down movement and includes a cradle adapted to engage a wheel of the vehicle during lifting and support.

A piston and cylinder means is provided between the base assembly and the cradle assembly for moving the cradle up and down relative to the base assembly, and a pawl and ratchet means is connected between the base assembly and the cradle assembly for permitting unrestricted upward movement of the cradle assembly while preventing unrestricted downward movement. The assembly also includes a locking means for locking the cradle assembly in a raised position relative to the base assembly. The locking means includes a hole in the post, a hole in the cradle assembly that is aligned with the hole in the post when the cradle assembly is in the raised position, and a pin insertable through the hole in the cradle assembly into the hole in the post to prevent the cradle assembly from being moved either up or down relative to the base assembly.

By providing a construction in accordance with the present invention, numerous-advantages are realized. For example, by providing a locking means for locking the cradle against either upward or downward movement relative to the base assembly when the cradle is in the raised position, the assembly satisfies the requirements of a stand, and provides reliable stable support of the vehicle.

In addition, by providing an apparatus that serves both the functions of a lift and of a support stand, it is possible to lift and support the vehicle without requiring placement of a separate stand beneath the vehicle. Thus, the assembly frees up space beneath the vehicle to allow the worker more room to perform repair operations.

BRIEF DESCRIPTION OF THE DRAWING FIGURES

A preferred embodiment of the present invention is described in detail below with reference to the attached drawing figures, wherein:

FIG. 2 is a side elevational view, partially in section, of the vehicle wheel lift and stand apparatus, illustrating a cradle assembly of the apparatus in a raised position;

FIG. 3 is a rear elevational view of the apparatus, illustrating the cradle assembly in a lowered position;

DETAILED DESCRIPTION OF THE PREFERRED EMBODIMENT

Figure 1:
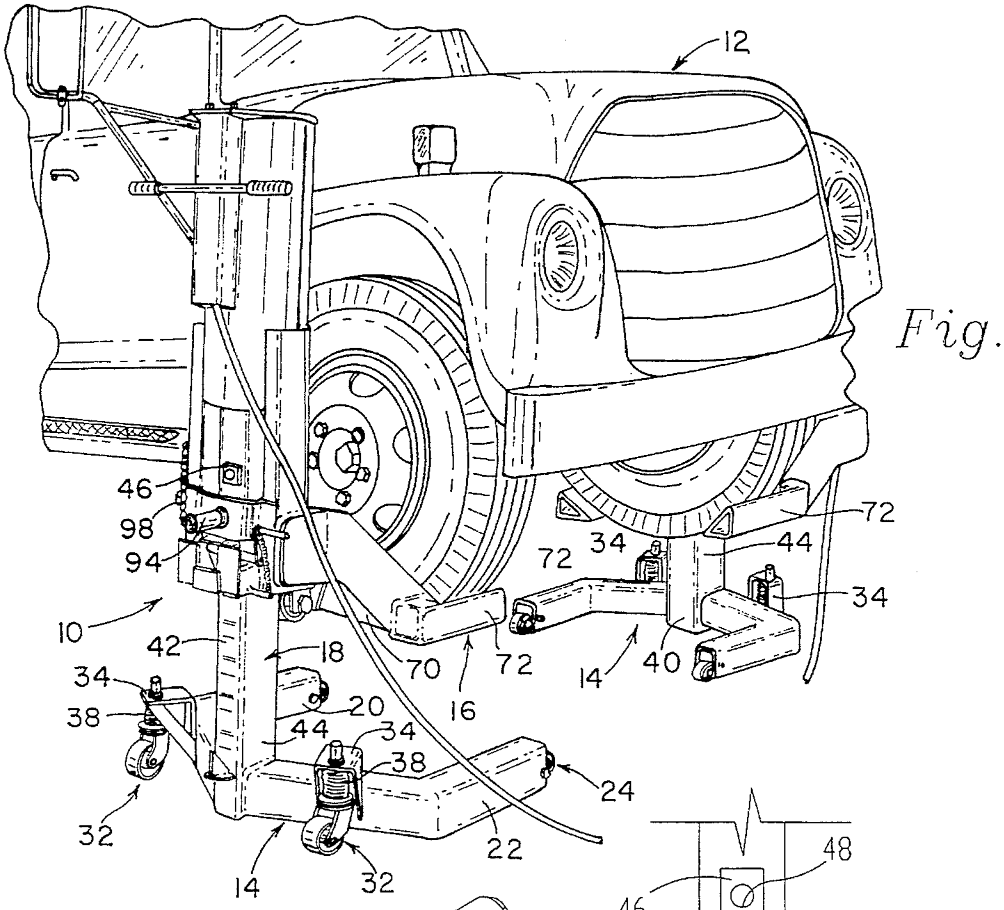
FIG. 1 is a perspective view of a pair of vehicle wheel lift and stand apparatuses constructed in accordance with the preferred embodiment of the present invention, illustrating the apparatuses supporting a truck in a raised position.

A pair of vehicle wheel lift and stand apparatuses 10 constructed in accordance with the preferred embodiment of the present invention are shown supporting the front wheels of a truck 12 in FIG. 1. Although a pair of the apparatuses are typically used to lift a vehicle, the apparatuses are the same as one another, and are each individually controlled by an worker so that the worker can maintain the level orientation of the truck during lifting.

An apparatus 10 is shown in FIG. 2, and generally includes a base assembly 14 and a cradle assembly 16. The base assembly includes a base adapted to rest on the ground during lifting and support of a vehicle, and an upstanding post 18 extending generally vertically upward from the base.

As shown in FIG. 1, the base is defined by a pair of feet 20, 22 that are spaced from one another and extend forward and outward from the post 18. Preferably, as shown in FIG. 2, each foot is formed of tubular steel or the like, having a square cross-sectional shape and being welded at one end to the lower end of the post 18. Each foot also presents a free end at the front of the apparatus spaced from the post.

A front roller assembly 24 extends from the free end of each foot, and includes a rocker arm 26 pivotally mounted to the foot and presenting a first end retained within the foot and a second exposed end. A roller 28 is supported for rotation on the exposed end of the arm and a compression spring 30 is positioned within the foot and engages the first end of the arm to bias the arm toward a position in which the roller extends beneath the foot.

Each foot 20, 22 is also fitted with a rear roller assembly 32 positioned adjacent the post 18. Each rear roller assembly includes a bracket 34 fixed to the foot and a roller 36 supported by the bracket for rotation. The roller 36 is retained on the bracket for linear movement between an extended position, as shown in FIG. 2, protruding beneath the base, and a raised position level with the base, as shown in FIG. 1. A compression spring 38 is supported between the roller and the bracket for biasing the roller toward the extended position.

Preferably, the biasing force of the springs 30, 38 is sufficient to maintain the rollers 28, 36 in the lowered, extended positions under the weight of the apparatus, but permit retraction of the rollers once lifting of a vehicle is initiated. Thus, the front and rear rollers allow easy movement of the apparatus around the work area, and are automatically retracted to a position level with the base when the weight of a vehicle is transferred to the apparatus.

The post 18 is formed of a single piece of tubular steel or other suitable material, and includes a square cross-sectional shape presenting opposed front and rear walls 40, 42, and lateral side walls 44. The post extends generally vertically upward from the base, but is preferably angled slightly relative to vertical so that the post leans slightly away from the front of the apparatus.

Figure 4:
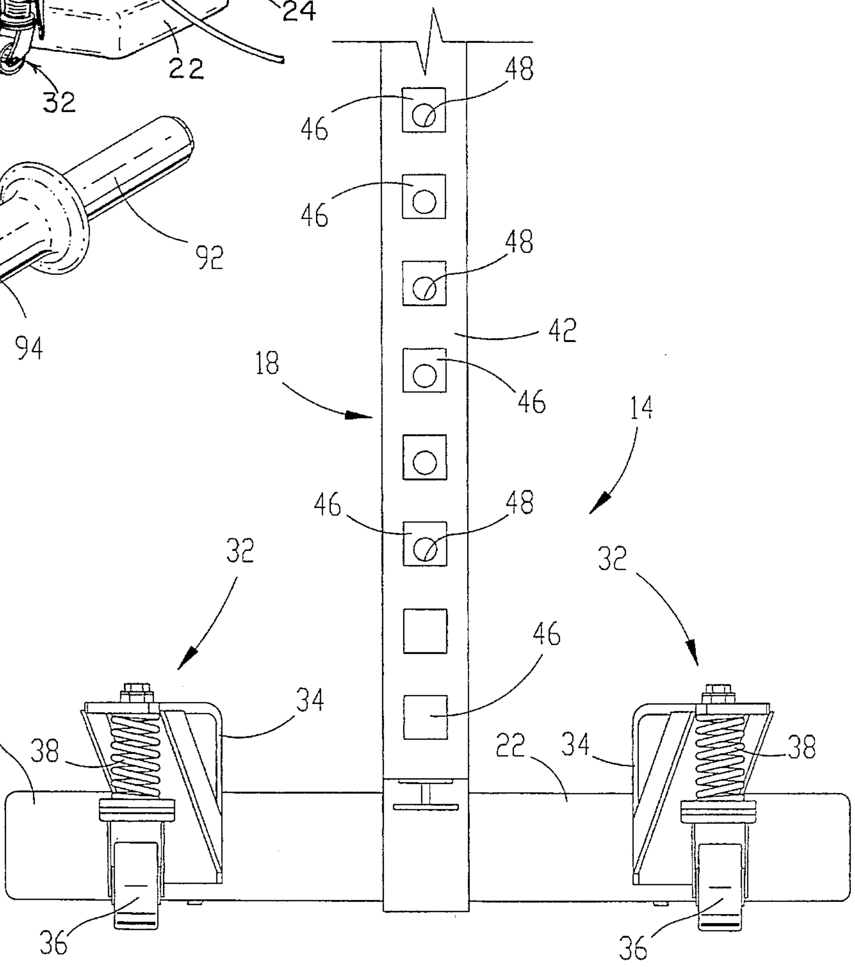
FIG. 4 is a rear elevational view of a base assembly of the apparatus.

The rear wall 42 of the post defines a ratchet surface, and includes a plurality of steps 46 welded to the post at spaced locations along the wall. Each step is of square cross-sectional shape, and presents a horizontal upper surface extending outward from the post at an angle of about 90° as shown in FIG. 2 Turning to FIG. 4, several of the steps are provided with holes 48 extending through the step and the rear wall into the interior of the post.

Returning to FIG. 2, the upper free end of the post 18 is provided with a piston 50 having a circular plan shape, and a seal 52 for permitting the piston to seat within a cylinder 54 of the cradle assembly 16. A triangular cam element 56 is welded to the rear wall at the lower end of the post, and includes an engagement surface that is angled upward and outward away from the rear wall. The function of this cam element is described below.

The cradle assembly 16 is shown in FIG. 2, and is supported on the post for up and down movement relative to the base assembly 14. The cradle assembly includes the cylinder 54, and a cradle 58 connected to the cylinder through a pair of depending legs 60, 62.

The cylinder 54 includes an inner diameter substantially equal to the diameter of the piston 50 on the free end of the post, and the piston is received in the cylinder to define a sealed space within the cylinder. A hose 64 is connected to the cylinder to permit fluid to be introduced into the sealed space under pressure in order to lift the cylinder and cradle assembly relative to the base assembly. This hose 64 is used to connect the cylinder with a conventional supply of compressed air in the preferred embodiment. However, the apparatus may be used with other types of pressurized fluids, such as hydraulic fluid or the like.

Turning to FIG. 3, the depending legs 60, 62 are secured on either lateral side of the cylinder 54, and are spaced slightly from the post of the base assembly. Each leg is preferably formed of tubular steel having a rectangular cross-sectional shape, and is secured to the cylinder by welding or the like at the upper end of the leg. A laterally extending support arm 66, 68 is welded to the lower end of each depending leg 60, 62 respectively, and extends toward the front of the apparatus. The cradle 58 is welded to the ends of the support arms 66, 68, and includes a transverse bar 70 and a pair of horizontally extending fingers 72. The transverse bar is formed of a tubular piece of steel or the like, having a square cross-sectional shape, and each finger includes an upturned L-shaped plate having a first end welded to the transverse bar and a second free end. A flat plate is welded across each L-shaped plate, and defines an angled wheel engaging surface which opposes the wheel engaging surface of the adjacent finger of the cradle, as is evident from FIG. 1.

As shown in FIG. 2, a bracket 74 extends between the depending legs 60, 62 across the front of the post, and supports a bearing roller 76 for rotatable movement on the cradle assembly. The bearing roller 76, is positioned to bear against the front wall of the post during movement of the cradle assembly, and maintains the stability of the cradle assembly relative to the base assembly.

A pawl and ratchet means is connected between the base assembly and the cradle assembly, and is movable to an operative position for permitting unrestricted upward movement of the cradle assembly while preventing unrestricted downward movement, and to an inoperative position for permitting unrestricted upward and downward movement of the cradle assembly.

The pawl and ratchet means includes a pawl assembly 78, supported between the depending legs of the cradle assembly, and the ratchet surface defined by the steps 46 on the rear wall of the post 18. The pawl assembly 78 includes a pawl housing 80 provided on the rear of the cradle assembly, and a pawl 82 supported within the housing for pivotal movement about a horizontal axis 84 extending in a direction parallel to the upper engagement surfaces of the steps. The pawl 82 is formed of a steel plate or the like, and includes a lower horizontal edge adapted to engage the upper surfaces of the steps to lock the cradle assembly against unrestricted downward movement. An upper portion of the pawl is spaced on the opposite side of the pivot axis 84 from the lower edge.

A tension spring 86 is connected between the upper portion of the pawl and the housing 80 for biasing the pawl in a counter-clockwise direction, as shown in FIG. 2, such that the lower edge is biased toward the ratchet surface. However, if the pawl is manually pivoted in a clockwise direction, the spring will pass over the pivot axis and bias the pawl away from the ratchet surface. Thus, the pawl is movable between an operative and inoperative position.

The cam 56 at the bottom of the post is arranged to contact the lower edge of the pawl when the cradle assembly is moved to the lowered position, and to pivot the pawl to the operative position. Thus, the cam ensures that the pawl and ratchet assembly is engaged during a lifting operation.

A steel plate 88 or the like is secured between the depending legs 60, 62 immediately above the pawl housing 80, and includes a circular hole 90 formed in the middle of the plate intermediate the depending legs and the upper and lower edges of the plate. As shown in FIG. 3, the hole in the plate is aligned with the center of the post and with the holes 48 formed in the steps 46.

The holes 48, 90 together form a part of a locking means for locking the cradle assembly in any one of a number of different raised positions. The locking means also includes a pin 92 that may be inserted through the hole 90 in the plate and any aligned hole 48 in the post to prevent the cradle assembly from being moved either up or down relative to the base assembly.

Figure 5:
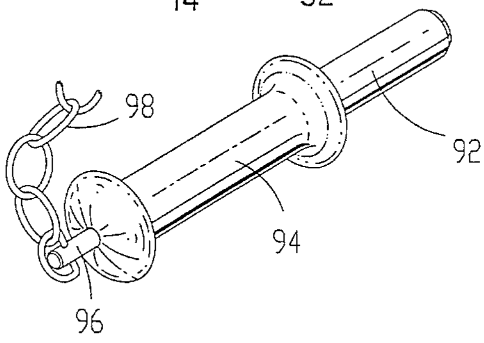
FIG. 5 is a perspective view of a locking pin forming a part of the apparatus.

The pin 92 is shown in FIG. 5, and includes an elongated cylindrical steel pin having a handle 94 by which the pin may be gripped. A connector pin 96 extends from the handle and includes a hole through which a chain 98 or other flexible connector is secured to the pin. The opposite end of the chain is secured to the cradle assembly 16, for example by attaching the chain to a pin 100 protruding from the cylinder 54. This construction enables the pin to remain attached to the cradle assembly so that the pin will not be lost. If desired, a cylindrical loop 102 may be affixed to the cradle assembly, as shown in FIG. 3, for receiving the pin for storage.

During use of the apparatus, it is positioned adjacent the wheel of a vehicle, with the fingers 72 of the cradle extending beneath the wheel on either side of the area within which the wheel engages the ground. During this positioning of the apparatus, the springs 30, 38 associated with the roller assemblies 24, 32 maintain the rollers 28, 36 in contact with the ground beneath the base so that the apparatus may be easily manipulated relative to the vehicle.

Once the apparatus is positioned, and a similar apparatus is set up adjacent the opposite wheel of the vehicle, air is supplied under pressure to the cylinders 54 of the two apparatuses, causing the cradle assemblies 16 to lift relative to the ground. This lifting action also raises the vehicle 12. Where two apparatuses are used, the worker controls the delivery of air to the two cylinders so that lifting of the vehicle is carried out in a uniform manner with the lifted wheels of the vehicle remaining substantially level with one another.

During lifting of the vehicle, as the cradle assemblies are lifted on the posts 18, the pawls 82 ride up and over each of the steps of the associated post against the bias of the springs 86. If at any time during lifting, the pressure is relieved from either of the cylinders, the associated cradle assembly will only move downward until the pawl engages the upper engagement surface of the next closest step beneath the pawl. This engagement prevents the vehicle from falling back to the ground.

After the vehicle has been lifted to a desired position at which repairs are to be made, pressure is relieved from the cylinder 54 of each apparatus 10 so that the pawl 82 engages the nearest step of the ratchet surface. With the pawl nesting against any one of the steps above the lowermost step, the hole in the step above the pawl housing 80 is in alignment with the hole 90 in the plate 88 of the cradle assembly. Thus, the pin 92 may be positioned in the holes 48, 90 and prevents the cradle assembly from being moved in either direction relative to the base assembly. Once the pins are positioned in both apparatuses, the apparatuses function as stands, and lifting and lowering of the apparatus is no longer permitted.

In order to lower the vehicle, the worker removes the pins 92, pressurizes the cylinders 54 to raise the pawls from engagement with the upper engagement surface of the step, and manually pivots the pawls 82 to the inoperative position. Thereafter, as pressure is relieved from the cylinders, the cradle assemblies are lowered to the ground.

By providing a construction in accordance with the present invention, numerous advantages are realized. For example, by forming the holes 48 in the steps 46, and by placing the hole 90 at a fixed height above the pawl 82, the holes 48, 90 are automatically aligned when the pawl is lowered into engagement with any of the steps above the lowermost step. This feature of the construction requires the worker to relieve pressure from the cylinder in order to use the locking means, and simplifies alignment of the holes. Thus, it is not necessary for the worker to repeatedly raise and lower the cradle assembly to align the holes.

Although the invention has been described with reference to the preferred embodiment illustrated in the attached drawing figures, it is noted that substitutions may be made and equivalents employed herein without departing from the scope of the invention as recited in the claims.

What is claimed is:

1. An apparatus for lifting a vehicle relative to the ground and for supporting the vehicle at a lifted position, the apparatus comprising: a base assembly including a base adapted to rest on the ground, and an upstanding post extending generally vertically upward from the base;

a cradle assembly supported on the post for up and down movement relative to the base assembly and including a cradle adapted to engage the vehicle during lifting and support of the vehicle;

a piston and cylinder means connected between the base assembly and the cradle assembly for moving the cradle up and down relative to the base assembly;

a pawl and ratchet means connected between the base assembly and the cradle assembly and being movable to an operative position for permitting unrestricted upward movement of the cradle assembly while preventing unrestricted downward movement, and to an inoperative position for permitting unrestricted upward and downward movement of the cradle assembly, the pawl and ratchet means including a movable pawl presenting an engagement surface, and a ratchet surface presenting a step against which the engagement surface of the pawl bears to prevent unrestricted downward movement of the cradle assembly in the operative position of the pawl and ratchet means,; and a locking means for locking the cradle assembly in a raised position relative to the base assembly, the locking means including a hole in the post, a hole in the cradle assembly that is aligned with the hole in the post when the engagement surface of the pawl is engaged with the step of the ratchet surface, and a pin insertable through the hole in the cradle assembly into the hole in the post to prevent the cradle assembly from being moved either up or down relative to the base assembly.

2. An apparatus as recited in claim 1, wherein the piston and cylinder means includes a piston provided on the post of the base assembly and a cylinder provided on the cradle assembly, the piston being received in the cylinder so that when fluid is delivered to the cylinder under pressure, the cradle assembly is raised relative to the base assembly.

3. An apparatus as recited in claim 1, wherein the pawl and ratchet means includes a ratchet surface on the post of the base assembly, a pawl supported for pivotal movement on the cradle assembly, and a biasing means for biasing the pawl toward the ratchet surface.

4. An apparatus as recited in claim 3, wherein the ratchet surface includes a plurality of steps protruding from the post, each step being rectangular in shape and presenting an upper engagement surface against which the pawl bears to prevent unrestricted downward movement of the cradle assembly in the operative position of the pawl and ratchet means.

5. An apparatus as recited in claim 1, wherein the cradle includes a pair of spaced fingers adapted to engage the wheel of the vehicle during lifting and support of the vehicle.

6. An apparatus as recited in claim 1, further comprising a plurality of rollers supported on the base assembly for allowing placement of the apparatus relative to the vehicle, the rollers being movable relative to the base assembly between an extended position protruding beneath the base and a raised position level with the base; and a biasing means for biasing the rollers toward the extended position so that the weight of the apparatus is supported by the rollers.

7. An apparatus for lifting a vehicle relative to the ground and for supporting the vehicle at a lifted position, the apparatus comprising:

a base assembly including a base adapted to rest on the ground, and an upstanding post extending generally vertically upward from the base;

a cradle assembly supported on the post for up and down movement relative to the base assembly and including a cradle adapted to engage the vehicle during lifting and support of the vehicle;

a piston and cylinder means connected between the base assembly and the cradle assembly for moving the cradle up and down relative to the base assembly;

a pawl and ratchet means connected between the base assembly and the cradle assembly and being movable to an operative position for permitting unrestricted upward movement of the cradle assembly while preventing unrestricted downward movement, and to an inoperative position for permitting unrestricted upward and downward movement of the cradle assembly, the pawl and ratchet means including a ratchet surface on the post of the base assembly, a pawl supported for pivotal movement on the cradle assembly, and a biasing means for biasing the pawl toward the ratchet surface, the ratchet surface including a plurality of steps protruding from the post, each step being rectangular in shape and presenting an upper engagement surface against which the pawl bears to prevent unrestricted downward movement of the cradle assembly in the operative position of the pawl and ratchet means; and a locking means for locking the cradle assembly in a raised position relative to the base assembly, the locking means including a hole in the post formed through one of the steps of the ratchet surface, a hole in the cradle assembly that is aligned with the hole in the post when the cradle assembly is in the raised position, and a pin insertable through the hole in the cradle assembly into the hole in the post to prevent the cradle assembly from being moved either up or down relative to the base assembly.

8. An apparatus for lifting a vehicle relative to the ground and for supporting the vehicle at a lifted position, the apparatus comprising:

a base assembly including a base adapted to rest on the ground, and an upstanding post extending generally vertically upward from the base;

a cradle assembly supported on the post for up and down movement relative to the base assembly and including a cradle adapted to engage the vehicle during lifting and support of the vehicle;

a piston and cylinder means connected between the base assembly and the cradle assembly for moving the cradle up and down relative to the base assembly;

a pawl and ratchet means connected between the base assembly and the cradle assembly and being movable to an operative position for permitting unrestricted upward movement of the cradle assembly while preventing unrestricted downward movement, and to an inoperative position for permitting unrestricted upward and downward movement of the cradle assembly, the pawl and ratchet means including a ratchet surface on the post of the base assembly, a pawl supported for pivotal movement on the cradle assembly, and a biasing means for biasing the pawl toward the ratchet surface, the ratchet surface including a plurality of steps protruding from the post, each step being rectangular in shape and presenting an upper engagement surface against which the pawl bears to prevent unrestricted downward movement of the cradle assembly in the operative position of the pawl and ratchet means; and a locking means for locking the cradle assembly in a raised position relative to the base assembly, the locking means including a plurality of holes in the post, each formed through a different one of the steps of the ratchet surface, a hole in the cradle assembly that is aligned with the holes in the post when the cradle assembly is in the raised position, and a pin insertable through the hole in the cradle assembly into the holes in the post to prevent the cradle assembly from being moved either up or down relative to the base assembly.

9. An apparatus as recited in claim 2, wherein the cradle is connected to the cylinder by a pair of legs depending from the cylinder, the cradle assembly including a plate extending between the legs, the locking means hole in the cradle extending through the plate.

10. An apparatus as recited in claim 2, further comprising means for introducing pressurized air into the cylinder.

11. An apparatus as recited in claim 1, wherein the pin is connected to the cradle assembly by a flexible connector which enables movement of the pin into and out of the holes of the locking means.

12. An apparatus for lifting a vehicle relative to the ground and for supporting the vehicle at a lifted position, the apparatus comprising:

a base assembly including a base adapted to rest on the ground, and an upstanding post extending generally vertically upward from the base;

a cradle assembly supported on the post for up and down movement relative to the base assembly and including a cradle adapted to engage the vehicle during lifting and support of the vehicle;

a piston and cylinder means connected between the base assembly and the cradle assembly for moving the cradle up and down relative to the base assembly;

a pawl and ratchet means connected between the base assembly and the cradle assembly and being movable to an operative position for permitting unrestricted upward movement of the cradle assembly while preventing unrestricted downward movement, and to an inoperative position for permitting unrestricted upward and downward movement of the cradle assembly; and a locking means for locking the cradle assembly in a raised position relative to the base assembly, the locking means including a hole in the post, a hole in the cradle assembly that is aligned with the hole in the post when the cradle assembly is in the raised position, and a pin insertable through the hole in the cradle assembly into the hole in the post to prevent the cradle assembly from being moved either up or down relative to the base assembly, wherein the cradle assembly includes a pocket for receiving the pin of the locking means when the pin is not in use.

13. An apparatus as recited in claim 1, wherein the base defines a base area on the ground having a width and length greater than the width and length of the downward projected area of the cradle.

14. An apparatus for lifting a vehicle relative to the ground and for supporting the vehicle at a lifted position, the apparatus comprising:

a base assembly including a base adapted to rest on the ground, and an upstanding post extending generally vertically upward from the base;

a cradle assembly supported on the post for up and down movement relative to the base assembly and including a cradle adapted to engage the vehicle during lifting and support of the vehicle;

a piston and cylinder means connected between the base assembly and the cradle assembly for moving the cradle up and down relative to the base assembly;

a pawl and ratchet means connected between the base assembly and the cradle assembly and being movable to an operative position for permitting unrestricted upward movement of the cradle assembly while preventing unrestricted downward movement, and to an inoperative position for permitting unrestricted upward and downward movement of the cradle assembly, the pawl and ratchet means including a ratchet surface on the post of the base assembly, a pawl supported for pivotal movement on the cradle assembly, and a biasing means for biasing the pawl toward the ratchet surface, the ratchet surface including a plurality of steps protruding from the post, each step being rectangular in shape and presenting an upper engagement surface against which the pawl bears to prevent unrestricted downward movement of the cradle assembly in the operative position of the pawl and ratchet means; and a locking means for locking the cradle assembly in a raised position relative to the base assembly, the locking means including a hole in the post, a hole in the cradle assembly positioned at a fixed height above the pawl on the cradle assembly and aligned with the hole in the post when the pawl engages the upper engagement surface of one of the steps located beneath the hole in the post, and a pin insertable through the hole in the cradle assembly into the hole in the post to prevent the cradle assembly from being moved either up or down relative to the base assembly.

* * * * *